Figure 1:
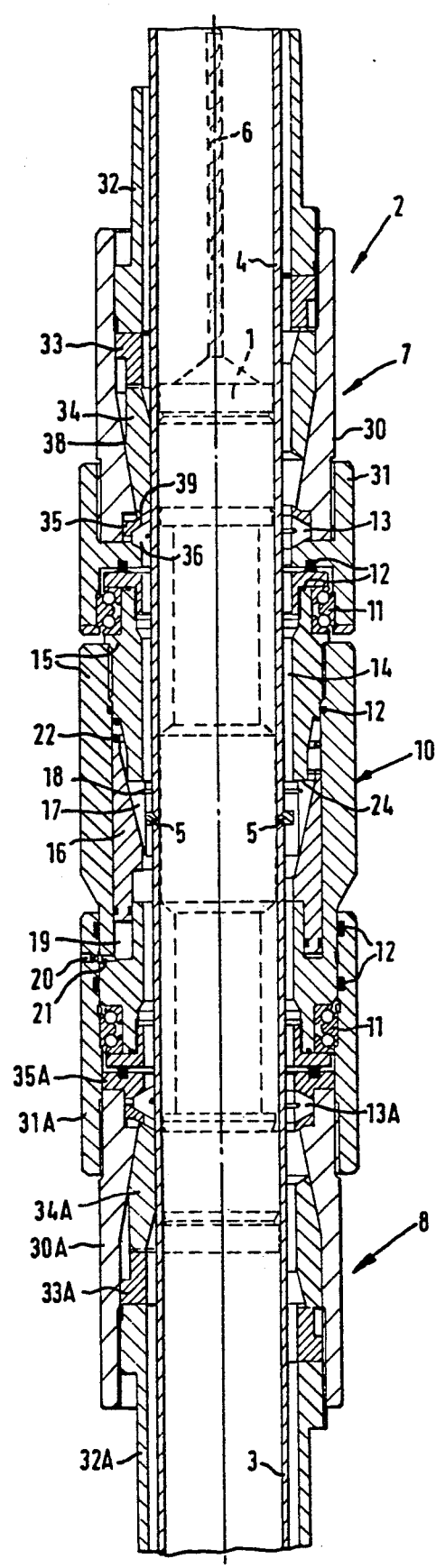

United States Patent [19]

Heijnen

[11] Patent Number: 5,071,053
[45] Date of Patent: Dec. 10, 1991

[54] METHOD AND DEVICE FOR JOINING WELL TUBULARS

[75] Inventor: Wilhelmus H. P. M. Heijnen, Assen, Netherlands

[73] Assignee: Shell Research Limited, London, United Kingdom

[21] Appl. No.: 521,716

[22] Filed: May 11, 1990

[30] Foreign Application Priority Data

May 3, 1989 [GB] United Kingdom ............... 8910118

[51] Int. Cl.⁵ ................................................ B23K 20/12
[52] U.S. Cl. ...................................... 228/112; 228/231;
228/2; 228/44.5; 228/48
[58] Field of Search .................... 228/112-114,
228/212, 231, 2, 44.5, 48

[56] References Cited

U.S. PATENT DOCUMENTS

| 3,934,780 | 1/1976 | Flax | 228/112 |
| 4,063,676 | 12/1977 | Lilly | 228/2 |
| 4,605,151 | 8/1986 | Brown | 228/44.5 |

FOREIGN PATENT DOCUMENTS 2140127 2/1973 Fed. Rep. of Germany ..... 228/44.5

Primary Examiner—Samuel M. Heinrich
Attorney, Agent, or Firm—Jones, Tullar & Cooper

[57] ABSTRACT

This invention relates to a method and device for joining well tubulars by a friction welding technique. The device includes apparatus for fixing tubular elements in a substantially vertical and aligned position near the well head and apparatus for rotating a welding ring relative to the tubular elements. According to the method a first tubular element is lowered partly into the well, positioning a welding ring positioned on top of this element hoisted to a substantially vertical position above the welding ring and the welding ring rotated relative to the tubular elements while the welding ring is deformed in a radial direction such that sufficient frictional heat is generated to create a friction weld between the welding ring and the tubular elements.

23 Claims, 2 Drawing Sheets

METHOD AND DEVICE FOR JOINING WELL TUBULARS

The invention relates to a method and device for joining well tubulars.

During completion of an oil or gas production well elongate strings of well tubulars have to be inserted into the well to protect the well against caving in and to facilitate a safe production of oil and gas through the well. The conventional way of protecting a well against caving in is to create a casing by screwing together one or more strings of casing pipes that are lowered into the well and cemented in place. Production of oil and gas takes place via one or more elongate production strings, consisting of production tubes that are interconnected by screw thread couplings, which production strings are suspended within the interior of the casing.

Accordingly the conventional procedure for completing a well requires many hundreds of screw thread connections to be made. Making up of these connections at the drilling floor is a time consuming procedure and it requires use of carefully machined well tubulars.

Prior proposals to weld well tubulars together at the drilling floor have not been successful in view of the associated explosion hazards in the event of escape of flammable fluids from the well. Known welding devices, such as the friction welding device known from U.S. Pat. No. 4,063,676, are therefore considered unsuitable for use on a drilling floor. The friction welding device known from this prior art reference is designed for welding pipeline sections together by a welding ring which is radially deformed while it is rotated about the pipe portion ends to generate frictional heat for creating a friction weld. During operation of the known device the welding ring is in direct contact with the atmosphere and the welding ring is rotated relative to a fixed support frame to which the pipe sections are fixedly secured in a horizontal orientation.

The present invention aims to provide a method and device for joining well tubulars by friction welding in an efficient and safe manner. The device should be easily movable such that it can be mounted on a drilling or workover rig. The method should be performed by drilling operators without broad expertise on welding technology, while use can be made of existing hoisting and rig equipment.

The method according to the invention comprises the steps of:

- lowering a first tubular element into a well until the upper end of the element is located in a substantially vertical orientation near the entrance of the well,
- positioning a welding ring on top of the tubular element,
- hoisting a second tubular element to a substantially vertical position above the welding ring,
- fixing the tubular elements in axial alignment with each other by means of clamps of a friction welding device,
- rotating the welding ring by means of the friction welding device relative to the tubular elements while deforming the welding ring in a radial sense such that the welding ring is in contact with the tubular elements thereby generating sufficient frictional heat to create a friction weld between the ring and the tubular elements, and
- lowering the interconnected tubular elements into the well.

The device according to the invention comprises:

- means for maintaining a first tubular element in a substantially vertical position suspended in a well while the upper end of the element is located near the entrance of the well,
- means for hoisting a second tubular element to a substantially vertical position above the suspended tubular element and a welding ring positioned on top of this element,
- clamps for fixing the tubular elements in axial alignment with each other, and
- a rotatable sleeve mounted between the clamps for rotating the welding ring relative to the tubular elements while deforming the welding ring in radial sense such that the welding ring is in contact with the tubular elements, thereby generating sufficient frictional heat to create a friction weld between the welding ring and the tubular elements.

The substantially vertical orientation of the tubular elements during the friction welding process according to the invention has the advantage that the upper end of the first tubular element, which is suspended in the well, can be firmly fixed near the drilling floor whereupon the second tubular element can be hoisted on top of the first element by means of the crown block of the drilling rig so that the welding process can be carried out with a relatively small mobile welding device which does not require a heavy foundation frame.

It is preferred that during the friction welding process according to the invention the interior and exterior of the tubular elements in the region of the welding ring are sealed during the step of rotating the ring so as to avoid any contact between the hot ring and flammable gases that may escape form the well. Sealing of the space around the welding ring may be achieved by creating around the ring a partly open and for example bell-shaped chamber into which an inert gas is injected. However, in general it is preferred to create a sealed chamber around the welding ring by rotating the welding ring around the tubular elements by means of a tubular mid section which carries claw means for gripping the welding ring, while the mid section is rotatably and sealingly connected by a bearing unit and sealing rings to a pair of tubular end sections of the welding device, which end sections are each clamped around the tubular elements by one of the clamps.

It is furthermore preferred to provide a seal within the interior of the first tubular element by arranging a cup seal near the lower end of a mandrel which is positioned inside the tubular elements during the welding process.

Preferably the mandrel is further equipped with a pair of clamps that are positioned opposite to the clamps on the end sections so that during the welding process the tubular elements are clamped between the pairs of internal and external clamps which allows a high contact pressure to be exerted by the clamps to the tubular elements without the risk of deformation or rupture of these elements.

Figure 2A:
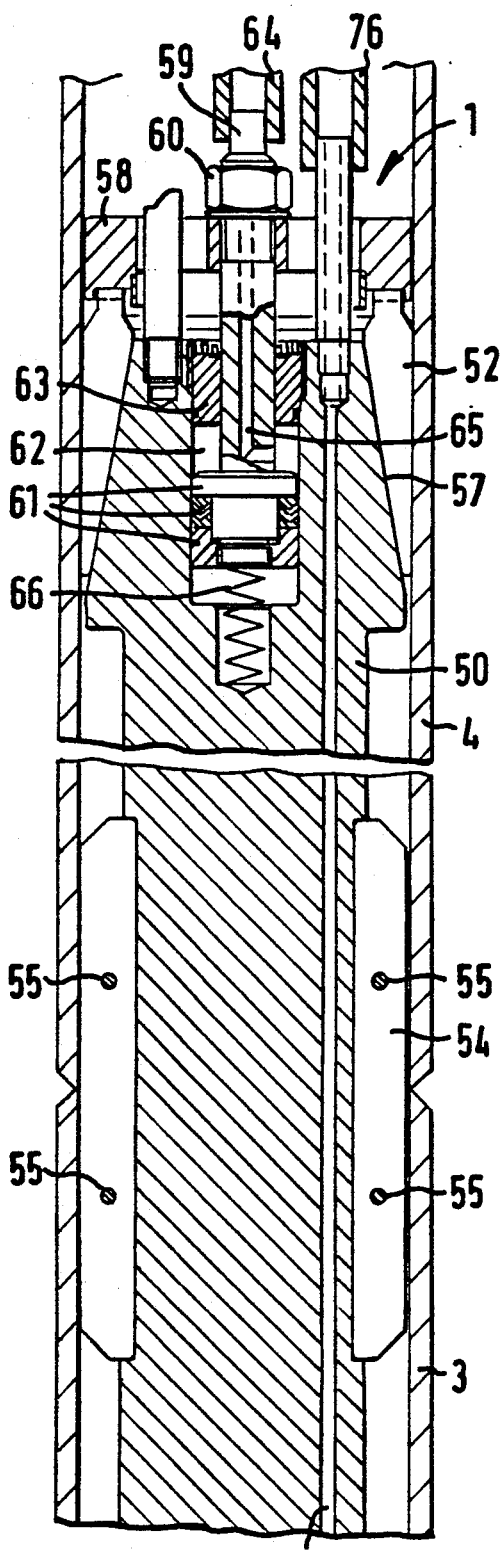
Figure 2B:
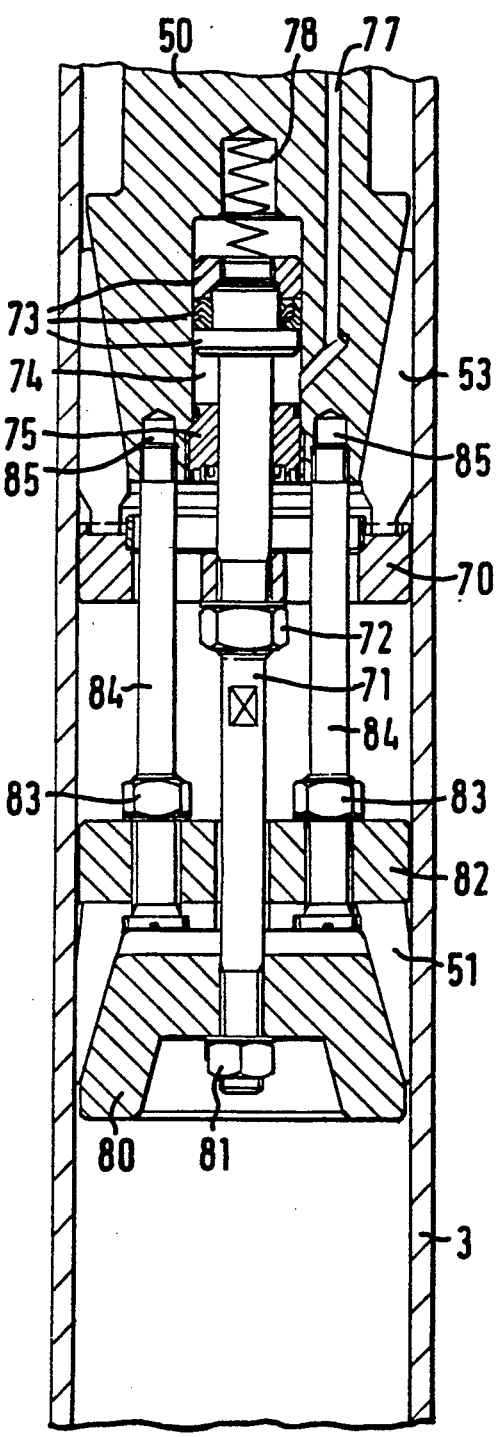

The invention will now be described in more detail by way of example with reference to the accompanying drawings, in which:

FIG. 1 shows a section through a friction welding device according to the invention, a mandrel of the device being illustrated in phantom lines, and FIGS. 2A and 2B show sections through an upper and a lower section, respectively, of the mandrel of the device of FIG. 1.

FIG. 1 shows a friction welding device consisting of a mandrel 1 and an external portion 2 arranged around a first and a second tubular element 3 and 4, respectively, which elements are to be interconnected by the welding ring 5 to a string of well tubulars. At the right side of FIG. 1 the external portion of the device is shown in an inactive position whereas at the left side of these Figures it is shown in an active position in which it is clamped to the tubular elements 3 and 4 and the welding ring 5.

The external portion 2 of the device consists of an upper tubular end section 7, a lower tubular end section 8 and a tubular mid section 10 which is rotatably connected to the end sections 7 and 8 by two bearing units 11.

In the region of the bearing units 11 a number of sealing rings 12 are arranged between adjacent surfaces of the mid section 10 and the end sections 7 and 8, which together with a flexible sealing ring 13 and 13A of each end section 7 and 8 create a confined space 14 between the inner surface of the outer portion 2 of the friction welding device and the outer surfaces of the tubular elements 3 and 4 in the region of the welding ring 5.

The tubular mid section 10 consists of a pair of sleeves 15 that are screwed together, an annular piston 16 having a tapered inner surface and a series of claw segments 17 having tapered outer surfaces that are pressed against the tapered inner surface of the piston 16 by an expansion ring 18.

The annular piston 16 is at one of its ends slidably arranged inside an annular cylinder 19 which is in fluid communication with a fluid feed 20 via radial bores and an annular groove 21.

In use the claw segments 17 are clamped around the welding ring 5 by pumping hydraulic fluid via the fluid feed 20 into the cylinder 19 thereby urging the piston 16 to move in the upward direction against the action of a spring 22 from the position shown at the right side of FIG. 1 to the position at the left side of FIG. 1. As a result of the upward movement of the piston 16 the claw segments 17 are pressed onto the welding ring 5 while rotation of the segments 17 relative to the rotating mid section 10 is prevented by radial grooves 24 in abutting radial end surfaces of the upper sleeve 15 and the segments 17.

The upper and lower tubular end sections 7 and 8 of the external portion 2 of the welding device are identical to each other. Therefore only the construction and operation of the upper tubular end section 7 will be described in detail.

The upper tubular end section 7 consists of two sleeves 30 and 31 which are screwed together, a cap nut 32, a guide ring 33, a series of wedges 34, an actuator ring 35 and the flexible sealing ring 13.

In use the upper tubular end section 7 is clamped around the second tubular element 4 by screwing the cap nut 32 into the sleeve 30 from the position shown at the right side of FIG. 1 to the position shown at the left side of FIG. 1. The downward motion of the cap screw 32 is transferred via the guide ring 33 to the wedges 34 which slide along a tapered inner surface 38 of the sleeve 30 and are pressed onto the outer surface of the second tubular element 4. The lower tips 39 of the wedges 34 thereby press the actuator ring 35 in the downward direction which causes the flexible sealing ring 13 to be pressed against the outer surface of the second tubular element 4 thereby providing a fluid tight seal between the second tubular element 4 and the upper tubular end section 7 of the welding device.

The lower tubular end section 8 consists of sleeves 30A and 31A which are screwed together, a cap nut 32A, a guide ring 33A, a series of wedges 34A, an actuator ring 35A and the flexible sealing ring 13A.

Operation of the lower tubular end section 8 is similar to operation of the upper tubular end section 7 described above.

It will be understood that if desired the cap nuts 32 and 32A for activating the wedges 34 and 34A may be replaced by hydraulic pistons or other actuator mechanisms.

Referring now to FIGS. 2A and 2B there is shown the construction of the mandrel 1 of the friction welding device. The mandrel 1 comprises a central body 50 which carries at its lower end a sealing cup 51 and around which an upper and a lower wedge assembly 52 and 53 and a split weld supporting sleeve 54 are arranged.

The split weld supporting sleeve 54 consists of two sleeve segments that are interconnected by dowels 55. Each sleeve segment may be equipped with electrical heater coils that are fed via electrical conduits passing through the central body 50.

The upper wedge assembly 52 consists of a series of wedges that are clamped between a tapered outer surface 57 of the central body 50 and inner surface of the second tubular element 4 by a downward motion of an upper actuator disc 58 relative to the central body 50. The upper actuator disc 58 is connected to a hollow actuator rod 59 by a locking nut 60.

The actuator rod 59 carries near its lower end a piston and stuffing box assembly 61 which is slidably secured inside a cylindrical chamber 62 formed in the central body 50. The chamber 62 is closed at its top by a cap 63 and by pumping fluid into the chamber 62 via a fluid feed conduit 64 and a bore 65 in the actuator rod 59, the actuator rod 59 is pushed into the upper end of the central body 50 against the action of a spring 66, thereby inducing the upper actuator disc 58 to clamp the upper wedge assembly 52 against the inner surface of the second tubular element 4.

The lower wedge assembly 53 is clamped against the inner surface of the first tubular element 3 by an upward motion of a lower actuator disc 70 relative to the central body 50.

The lower actuator disc 70 is connected to an elongated rod 71 by a locking nut 72. The rod 71 carries near its upper end a piston and stuffing box assembly 73 which is slidably arranged inside a cylindrical chamber 74 formed at the lower end of the central body 50. The chamber 74 is closed at its lower end by a cap 75 and by pumping fluid into the chamber 74 via fluid feed conduit 76 and a bore 77 passing through the central body 50 the rod 71 is pushed into the lower end of the body 50 against the action of a spring 78, thereby inducing the lower actuator disc 70 to clamp the assembly of wedges 53 against the inner wall of the first tubular element 3.

The rod 71 is at its lower end connected to a trapezoidal body 80 by a nut 81. The sealing cup 51 is held at a location just above the body by means of a support plate 82 which is locked by nuts 83 to a series of spacer rods 84. The spacer rods 84 pass through openings in the lower actuator disc 70 and are screwed into recesses 85 at the lower end of the central body 50.

The connection of the trapezoidal body 80 and the lower actuator disc 70 to the rod 71 facilitates a simultaneous activation of the sealing cup 51 and the lower wedge assembly 53. If the rod 71 is pulled into the lower end of the central body 50 by injecting fluid via the bore 77 into the chamber the wedge assembly 53 is clamped against the inner wall of the first tubular element 3 by the actuator disc 70 whereas at the same time the sealing cup 51 is clamped to the inner wall of the tubular element 3 by the movement of the trapezoidal body 80 towards the support plate 82.

Release of pressure inside the chamber 74, on the other hand, allows the spring 78 to push the rod 71 away from the central body 50 thereby inducing the simultaneous release of the wedge assembly 53 and sealing cup 51 from the inner wall of the first tubular element 3.

A preferred procedure for joining well tubulars with the device shown in FIGS. 1, 2A and 22b is as follows.

The external portion 2 of the friction device is mounted or suspended in a substantially vertical position above the wellhead (not shown) of the well in which the well tubulars are to be inserted, for example to create a casing string or one or more production strings.

The tubular elements for use in the string or strings are stored in a slant or vertical orientation in a pipe rack near the wellhead, and the external portion of the friction welding device is located above the well (not shown).

A first tubular element 3 is then retrieved from the pipe rack and lowered through the external portion 2 of the friction welding device into the well until the upper end of this element is located in a vertical orientation just above the upper clamp nut 32 of the external portion 2 of the friction welding device, whereupon the welding ring 5 is laid on top of the first tubular element 3.

Subsequently the internal mandrel 1 of the device, while it is suspended on a hoisting cable 6 carried by for example the crown block of a drilling rig mounted above the well, is lowered through the second tubular element 4 until the mandrel 1 protrudes about halfway from the lower end of this element 4.

Then the mandrel 1 is clamped to the inner wall of the second tubular element 4 by activating the upper wedge assembly 52 by injecting fluid into the chamber 62 via the conduit 64, whereupon the mandrel 1, with the second tubular element 4 attached thereto, is hoisted by the cable 6 to a vertical position above the first tubular element 3. As a next step the lower part of the mandrel 1 is stabbed through the welding ring 5 into the upper end of the first tubular element 3 until the lower end of the second tubular element 4 rests upon the welding ring 5 and/or the upper end of the first tubular element 3.

After establishing that the welding ring 5 and the abutting ends of the tubular elements 3 and 4 are properly located in co-axial orientations the lower wedge assembly 53 and the sealing cup 51 of the mandrel 1 are clamped to the inner wall of the first tubular element 3 by injecting fluid into the chamber 74 via the conduit 76.

Subsequently the external portion 2 of the device is axially moved relative to the mandrel 1 either by lowering the mandrel 1 with the tubular elements 3 and 4 clamped thereto, or by raising the external portion 2 of the device to a higher level above the wellhead, until the welding ring 5 is surrounded by the claw segments 17.

Then the wedges 34A and the flexible sealing ring 13A of the lower tubular end section 8 of the external portion 2 of the device are clamped around the first tubular element 3 by tightening of the cap nut 32A, whereas the wedges 34 and the flexible sealing ring 13 of the upper tubular end section 7 of the external portion of the device are clamped around the second tubular element 4 by tightening the cap nut 32. As the axial spacing between the wedges 34 and 34A is identical to the axial spacing between the wedge assemblies 52 and 53 of the mandrel 1 a high radial clamping force may be exerted between the wedges and the walls of the tubular elements 3 and 4 without the risk of deformation or rupture of these elements.

After having thus clamped the mandrel 1 and external portion 2 of the device to the tubular elements 3 and 4 in such a manner that any access of flammable gasses from the well to the region of the welding ring is prevented by the sealing cup 51 and sealing rings 12, 13 and 13A the claw segments 17 are clamped around the welding ring 5 by an upward movement of the annular piston 16 by means of pumping fluid via the fluid inlet 21 into the annular cylinder 19.

Subsequently the mid section 10 with the welding ring 5 attached thereto is rotated by means of a hydraulic or electric motor or modified tubing torque tongs (not shown) relative to said end sections 7 and 8.

During rotation of the mid section 10 the claw segments 17 exert a predetermined radial force against the welding ring 5. The magnitude of the radial force may be adjusted in relation to either the radial compression force exerted to the ring or to the radial deformation of the ring. The radial force exerted against the welding ring 5 and the speed of rotation of the conical inner surface of the welding ring 5 over the conical outer surfaces of the ends of the tubular elements 3 and 4 are of such a magnitude that sufficient frictional heat is generated to create a frictional weld between the welding ring 5 and tubular elements 3 and 4.

After creation of the weld a heat treatment of the weld and interconnected ends of the tubular elements 3 and 4 is carried out by heating the welding ring 5 and said ends of the tubular elements by means of the heating coils in the split weld supporting sleeve 54 of the mandrel 1. The heat treatment may also be conducted by an external heating device (not shown).

Subsequently the mandrel 1 and external portion 2 of the device are released from the welding ring 5 and the tubular elements 3 and 4 by releasing the claw segments 16 and the assemblies of wedges 34, 34A, 52 and 53 whereupon the created weld may be inspected.

A next tubular element may be connected on top of the second tubular element 4 by repeating the friction welding process described above, which process may be repeated again and again until the string of well tubulars has its required length.

In the above described method the first tubular element was lowered into the well through the external portion of the friction welding device. Alternatively, the first tubular element can be lowered into the borehole and the external portion of the friction welding device can be arranged on top of the first tubular element.

While the foregoing description with reference to the drawing is directed to preferred embodiments of a method and device according to the invention, many variations and modifications may be made in the design and procedure for operating the device without departing from the concept of the present invention.

Accordingly, it should be clearly understood that the device and method depicted in the accompanying drawings and referred to in the foregoing description are illustrative only and are not intended as limitations on the scope of the invention.

I claim:

1. A method for joining well tubulars, the method comprising the steps of:
   lowering a first tubular element into a well until the upper end of the element is located in a substantially vertical orientation near the entrance of the well,
   positioning a welding ring on top of said tubular element,
   hoisting a second tubular element to a substantially vertical position above the welding ring,
   fixing the tubular elements in axial alignment with each other by means of clamps of a friction welding device,
   rotating the welding ring by means of the friction welding device relative to the tubular elements while deforming the welding ring in the radial direction such that the ring is in contact with the tubular elements thereby generating sufficient frictional heat to create a friction weld between the welding ring and the tubular elements, and
   lowering the interconnected tubular elements into the well.

2. The method of claim 1 further comprising the step of sealing the interior and exterior of the tubular elements in the region of the welding ring during the step of rotating the welding ring.

3. The method of claim 1 or 2 wherein the welding ring is rotated around the tubular elements by rotating a tubular mid section of the friction welding device relative to a pair of tubular end sections of the device, said mid section carrying claw means for gripping the welding ring and each of said end sections carrying one of the clamps for fixing one of the tubular elements, and said mid section being connected to each of the end sections by a bearing unit.

4. The method of claim 2 wherein said tubular mid and end sections form a sealed chamber around the welding ring during the step of rotating the welding ring.

5. The method of claims 3 wherein before and during the step of rotating the welding ring a mandrel is placed inside the tubular elements and clamped against their internal surfaces by means of a pair of clamps that are expanded against these surfaces at locations opposite to the locations where the clamps of the tubular end sections of the device are positioned.

6. The method of claim 5 wherein the second tubular element is hoisted to a position above the welding ring by moving the mandrel in a downward direction therethrough, while the mandrel is secured to a hoisting cable, until the mandrel protrudes about halfway from the lower end of this element, whereupon one of the clamps is expanded against its inner surface and the mandrel, while it carries the second tubular element, is lifted by the hoisting cable to a vertical position above the first tubular element whereupon the protruding end of the mandrel is stabbed through the welding ring into the first tubular element and fixed thereto by expanding the other clamp of the mandrel.

7. The method of claim 2 wherein before the step of rotating the welding ring a sealing cup, which is mounted near the lower end of the mandrel, is expanded against the inner surface of the first tubular element so as to avoid ingress of flammable fluids via the interior of this tubular element to the location of the welding ring.

8. The method of claim 3 wherein said tubular mid and end sections form a sealed chamber around the welding ring during the step of rotating the welding ring.

9. The method of claim 4 wherein before and during the step of rotating the welding ring a mandrel is placed inside the tubular elements and clamped against their internal surfaces by means of a pair of clamps that are expanded against these surfaces at locations opposite to the locations where the clamps of the tubular end sections of the device are positioned.

10. The method of claim 6 wherein before the step of rotating the welding ring a sealing cup, which is mounted near the lower end of the mandrel, is expanded against the inner surface of the first tubular element so as to avoid ingress of flammable fluids via the interior of this tubular element to the location of the welding ring.

11. A device for joining well tubulars comprising:
   a welding ring,
   means for maintaining a first tubular element in a substantially vertical position suspended in a well while the upper end of the element is located near the entrance of the well,
   means for hoisting a second tubular element to a substantially vertical position above the suspended tubular element and the welding ring positioned on top of said suspended tubular element,
   clamps for fixing the tubular elements in axial alignment with each other, and
   a rotatable sleeve mounted between said clamps for rotating the welding ring relative to said tubular elements while deforming the welding ring in a radial sense such that the welding ring is in contact with the tubular elements, thereby generating sufficient frictional heat to create a friction weld between the welding ring the tubular elements.

12. The device of claim 11 further comprising means for sealing the interior and exterior of the tubular elements in the region of the welding ring during the step of rotating the welding ring.

13. The device of claim 11 wherein the rotatable sleeve is at each of its ends connected by a bearing to a tubular end portion which carries at its inner surface one of said clamps which is securable around one of the tubular elements.

14. The device of claim 11 wherein the rotatable sleeve contains an annular piston which has a tapered inner surface that surrounds the tapered outer surfaces of a series of claw segments which are in use clamped around the welding ring by axially moving the piston relative to the sleeve.

15. The device of claims 12 or 14 wherein between the rotatable sleeve and the end pieces sealing rings are arranged for providing in use a sealed chamber around the welding ring.

16. The device of claims 13 wherein the clamp of each tubular end portion consists of a series of wedges that are contained inside a tapered inner surface of the tubular end portion, each of said wedges facing at one end thereof an actuator ring which is axially movable through the tubular end portion by means of a nut which is screwed into the terminal end of said end portion, and each of said wedges facing at another end thereof a ring with tapered sides, which ring activates in response to an inward movement of the wedges caused by tightening of the nut to seal off the annular space between the tubular element and the surrounding tubular end portion.

17. The device of claim 13 wherein said hoisting means include a mandrel which is securable within the tubular elements by a pair of clamps that have the same axial spacing as the clamps of the tubular end portions between which the rotatable sleeve is arranged.

18. The device of claim 12 wherein the mandrel is at one of its ends connectable to a hoisting cable and is at its opposite end equipped with a sealing cup which in use seals off an annular space between the first tubular element and the mandrel in response to activation of the clamp which fixes the mandrel to the first tubular element.

19. The device of claim 17 wherein a mid portion of the mandrel is surrounded by a split weld supporting sleeve that has a slightly smaller external diameter than the internal diameter of the tubular elements.

20. The device of claim 19 wherein the mandrel is equipped with heating means for maintaining the split weld supporting sleeve and the surrounding portions of the tubular elements at a desired temperature during and after the step of rotation of the welding ring.

21. The device of claim 15 wherein the clamp of each tubular end portion consists of a series of wedges that are contained inside a tapered inner surface of the tubular end portion, each of said wedges facing at one end thereof an actuator ring which is axially movable through the tubular end portion by means of a nut which is screwed into the terminal end of said end portion, and each of said wedges facing at another end thereof a ring with tapered sides, which ring activates in response to an inward movement of the wedges caused by tightening of the nut to seal off the annular space between the tubular element and the surrounding tubular end portion.

22. The device of claim 17 wherein the mandrel is at one of its ends connectable to a hoisting cable and is at its opposite end equipped with a sealing cup which in use seals off an annular space between the first tubular element and the mandrel in response to activation of the clamp which fixes the mandrel to the first tubular element.

23. The device of claim 18 wherein a mid portion of the mandrel is surrounded by a split weld supporting sleeve that has a slightly smaller external diameter than the internal diameter of the tubular elements.

* * * * *